(12) United States Patent
Henn et al.

(10) Patent No.: US 11,097,979 B2
(45) Date of Patent: Aug. 24, 2021

(54) COVER PANEL WITH COLOUR-NEUTRAL COATING

(71) Applicant: SCHOTT AG, Mainz (DE)

(72) Inventors: Christian Henn, Frei-Laubersheim (DE); Thorsten Damm, Eltville am Rhein (DE); Franziska Back, Udenheim (DE); Yvonne Menke-Berg, Wiesbaden (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/228,855

(22) Filed: Dec. 21, 2018

(65) Prior Publication Data
US 2019/0194065 A1   Jun. 27, 2019

(30) Foreign Application Priority Data

Dec. 22, 2017   (DE) .......................... 102017131152.1
May 7, 2018    (DE) .......................... 102018110909.1

(51) Int. Cl.
*F24C 15/10*   (2006.01)
*C03C 4/08*    (2006.01)
(Continued)

(52) U.S. Cl.
CPC .......... *C03C 17/002* (2013.01); *C03B 27/012* (2013.01); *C03C 4/08* (2013.01);
(Continued)

(58) Field of Classification Search
CPC ....... C03C 17/002; C03C 17/00; C03C 17/02; C03C 17/06; C03C 17/23; C03C 17/22;
(Continued)

(56) References Cited

U.S. PATENT DOCUMENTS

| | | |
|---|---|---|
| 3,756,798 A | 9/1973 | Ernsberger |
| 3,788,865 A | 1/1974 | Babcock |
| (Continued) | | |

FOREIGN PATENT DOCUMENTS

| | | |
|---|---|---|
| CN | 1326903 | 12/2001 |
| CN | 1332127 | 1/2002 |
| (Continued) | | |

OTHER PUBLICATIONS

D65 standard illuminant light, Wikipedia, 4 pages.
(Continued)

*Primary Examiner* — Humera N. Sheikh
*Assistant Examiner* — Katherine A Christy
(74) *Attorney, Agent, or Firm* — Ohlandt, Greeley, Ruggiero & Perle, L.L.P.

(57) ABSTRACT

A cover panel for a fitout article or article of equipment for a kitchen or laboratory is provided. The cover panel includes a glass or glass ceramic substrate and a coating on one side of the substrate. The substrate and the coating together have a light transmittance of 1% to 70%. The coating has a colour locus in the CIELAB colour space within the range of coordinates L* of 20 to 65, a* of −6 to 6 and b* of −6 to 6. The colour locus of the D65 standard illuminant light, after passing through the substrate and the coating, is within a white region W1 determined in the chromaticity diagram CIExyY-2° by the following coordinates:

| White region W1 | |
|---|---|
| x | Y |
| 0.27 | 0.21 |
| 0.22 | 0.25 |

(Continued)

-continued

| White region W1 | |
|---|---|
| x | Y |
| 0.32 | 0.37 |
| 0.45 | 0.45 |
| 0.47 | 0.34 |
| 0.36 | 0.29. |

22 Claims, 3 Drawing Sheets (51) Int. Cl.
    *C03C 4/10* (2006.01)
    *C03C 17/00* (2006.01)
    *C03C 10/00* (2006.01)
    *C03C 17/22* (2006.01)
    *C03C 17/36* (2006.01)
    *C03C 17/245* (2006.01)
    *C03C 17/09* (2006.01)
    *C03C 17/23* (2006.01)
    *C03B 27/012* (2006.01)
    *C03C 17/02* (2006.01)

(52) U.S. Cl.
    CPC ............ *C03C 4/10* (2013.01); *C03C 10/0027* (2013.01); *C03C 17/00* (2013.01); *C03C 17/006* (2013.01); *C03C 17/02* (2013.01); *C03C 17/09* (2013.01); *C03C 17/22* (2013.01); *C03C 17/23* (2013.01); *C03C 17/245* (2013.01); *C03C 17/36* (2013.01); *C03C 17/3607* (2013.01); *C03C 17/3649* (2013.01); *C03C 17/3686* (2013.01); *F24C 15/10* (2013.01); *C03C 2217/228* (2013.01); *C03C 2217/23* (2013.01); *C03C 2217/27* (2013.01); *C03C 2217/29* (2013.01); *C03C 2218/155* (2013.01)

(58) Field of Classification Search
    CPC .............. C03C 17/36; C03C 17/3607; C03C 17/3649; C03C 17/3686; C03C 4/08; C03C 10/0027; F24C 15/10
    USPC ........................................................ 428/432
    See application file for complete search history.

(56) References Cited

U.S. PATENT DOCUMENTS

| 4,285,728 | A | 8/1981 | Babcock |
|---|---|---|---|
| 4,455,160 | A | 6/1984 | Rittler |
| 4,461,839 | A | 7/1984 | Rittler |
| 4,526,872 | A | 7/1985 | Andrieu |
| 4,835,121 | A | 5/1989 | Shibuya |
| 5,010,041 | A | 4/1991 | Koyama |
| 5,179,045 | A | 1/1993 | Aitken |
| 5,204,293 | A | 4/1993 | Amundson, Jr. |
| 5,212,122 | A | 5/1993 | Pannhorst |
| 5,256,600 | A | 10/1993 | Pfitzenmaier |
| 5,446,008 | A | 8/1995 | Krolla |
| 6,413,906 | B1 | 7/2002 | Shimatani |
| 8,722,554 | B2 | 5/2014 | Comte |
| 8,765,619 | B2 | 7/2014 | Brunet |
| 9,156,727 | B2 | 10/2015 | Siebers |
| 2002/0011481 | A1 | 1/2002 | Melson |
| 2002/0023463 | A1 | 2/2002 | Siebers |
| 2003/0054935 | A1 | 3/2003 | Kitamura |
| 2003/0218001 | A1 | 11/2003 | Siebers |
| 2004/0198579 | A1 | 10/2004 | Horsfall |
| 2005/0252503 | A1 | 11/2005 | Siebers |
| 2007/0004578 | A1 | 1/2007 | Comte |
| 2007/0056961 | A1 | 3/2007 | Shimatani |
| 2007/0108184 | A1 | 5/2007 | Imamoto |
| 2007/0129231 | A1 | 6/2007 | Comte |
| 2007/0232476 | A1 | 10/2007 | Siebers |
| 2007/0293386 | A1 | 12/2007 | Goto |
| 2008/0026927 | A1 | 1/2008 | Comte |
| 2008/0090034 | A1* | 4/2008 | Harrison .................. C03C 4/02 428/32.71 |
| 2008/0139375 | A1 | 6/2008 | Wennemann |
| 2008/0207424 | A1 | 8/2008 | Aitken |
| 2009/0018007 | A1 | 1/2009 | Siebers |
| 2010/0047556 | A1 | 2/2010 | Bockmeyer |
| 2010/0304944 | A1 | 12/2010 | Comte |
| 2010/0304948 | A1 | 12/2010 | Comte |
| 2011/0140843 | A1 | 6/2011 | Nireki |
| 2011/0226231 | A1 | 9/2011 | Siebers |
| 2012/0067865 | A1 | 3/2012 | Siebers |
| 2012/0085336 | A1 | 4/2012 | Brunet |
| 2013/0070451 | A1 | 3/2013 | Mulet |
| 2013/0098903 | A1 | 4/2013 | Di Giovanni |
| 2013/0178353 | A1 | 7/2013 | Comte |
| 2013/0201678 | A1 | 8/2013 | Siebers |
| 2013/0328946 | A1 | 12/2013 | Zenker |
| 2014/0009370 | A1 | 1/2014 | Weiss |
| 2014/0146530 | A1 | 5/2014 | Guiset |
| 2014/0146538 | A1 | 5/2014 | Zenker |
| 2014/0356608 | A1 | 12/2014 | Lentes |
| 2015/0266770 | A1 | 9/2015 | Miyasaka |
| 2015/0266771 | A1 | 9/2015 | Miyasaka |
| 2015/0274579 | A1 | 10/2015 | Plevacova |
| 2016/0031755 | A1 | 2/2016 | Hoppe |
| 2016/0168018 | A1 | 6/2016 | Gabel |
| 2016/0281961 | A1 | 9/2016 | Laluet |
| 2017/0215236 | A1 | 7/2017 | Doerk |
| 2019/0062201 | A1 | 2/2019 | Weiss |

FOREIGN PATENT DOCUMENTS

| CN | 1696072 | 11/2005 |
|---|---|---|
| CN | 1784363 | 6/2006 |
| CN | 1871179 | 11/2006 |
| CN | 101085699 | 12/2007 |
| DE | 1796298 | 5/1972 |
| DE | 2844030 | 4/1979 |
| DE | 3345316 | 6/1984 |
| DE | 3927174 | 2/1990 |
| DE | 19939787 | 1/2001 |
| DE | 10338165 | 3/2005 |
| DE | 102008031428 | 1/2010 |
| DE | 102008040097 | 1/2010 |
| DE | 102008050263 | 4/2010 |
| DE | 102009013127 | 9/2010 |
| DE | 102011050873 | 6/2012 |
| DE | 202011110029 | 10/2012 |
| DE | 102015103461 | 9/2016 |
| DE | 102016101036 | 7/2017 |
| DE | 102016103524 | 8/2017 |
| DE | 102016211065 | 12/2017 |
| EP | 0220333 | 5/1987 |
| EP | 1074520 | 2/2001 |
| EP | 1313675 | 5/2003 |
| EP | 1465460 | 10/2004 |
| EP | 1398303 | 11/2005 |
| EP | 1837312 | 9/2007 |
| EP | 2435378 | 7/2014 |
| EP | 2817265 | 12/2014 |
| EP | 3208545 | 8/2017 |
| EP | 3049374 | 11/2017 |
| GB | 2430249 | 2/2009 |
| JP | H0551235 | 3/1993 |
| JP | H11100229 | 4/1999 |
| JP | H11100230 | 4/1999 |
| JP | H11100231 | 4/1999 |
| JP | 2004251615 | 9/2004 |
| JP | 2006252808 | 9/2006 |
| JP | 6086311 | 3/2017 |

(56) References Cited

FOREIGN PATENT DOCUMENTS

| | | |
|---|---|---|
| WO | 0216279 | 2/2002 |
| WO | 2010013700 | 2/2010 |
| WO | 2010102859 | 9/2010 |
| WO | 2010137000 | 12/2010 |
| WO | 2011089220 | 7/2011 |
| WO | 2012010278 | 1/2012 |
| WO | 2012076412 | 6/2012 |
| WO | 2012076414 | 6/2012 |
| WO | 2012168011 | 12/2012 |
| WO | 2013124240 | 8/2013 |
| WO | 2014170275 | 10/2014 |
| WO | 2018224554 | 12/2018 |
| WO | 2018224556 | 12/2018 |

OTHER PUBLICATIONS

DIN EN ISO 11664-4 "Colorimetry—Part 4: CIE 1976 L*a*b* colour space", Jun. 2012, 12 pages.

ISO 7991, "Glass—Determination of coefficient of mean linear thermal expansion", Dec. 15, 1987, 12 pages.

ASTM D1003—13; "Standard Test Method for Haze and Luminous Transmittance of Transparent Plastics", Nov. 15, 2013, 7 pages.

DIN ISO 7884-8, "Glass—Viscosity and viscometric fixed points—Part 8: Determination of (dilatometric) transformation temperature", Feb. 1998, 7 pages. (formerly DIN 52324).

DIN EN 410; "Glass in Building-Determination of luminous and solar characteristics of glazing", Apr. 2011, 66 pages.

Glass Ceramic transmission: SCHOTT NEXTREMA optical properties, Schott North America, Oct. 2017.

DIN ISO 7884-8, "Glass—Viscosity and viscometric fixed points—Part 8: Determination of (dilatometric) transformation temperature", Feb. 1998.

Le Bourhis, "Glass Mechanics and Technology", Wiley-VCH GmbH & Co. KGaA, 3 pages.

"Schott Technical Glasses", Schott AG, Mainz, Germany, Oct. 2007, 40 Pages.

* cited by examiner

COVER PANEL WITH COLOUR-NEUTRAL COATING

CROSS REFERENCE TO RELATED APPLICATIONS

This application claims benefit under 35 USC 119 of German Application 10 2017 131 152.1 filed Dec. 22, 2017 and 10 2018 110 909.1 filed May 7, 2018, the entire contents of both of which are incorporated herein by reference.

BACKGROUND

1. Field of the Invention

The invention relates to colour-neutral cover panels for fitout articles or articles of equipment for kitchens or laboratories, comprising a glass or glass ceramic substrate and a coating on one side of the glass or glass ceramic substrate.

2. Description of Related Art

Covering means made of glass or glass ceramic are used in various ways in fitout articles and articles of equipment for kitchens and laboratories. According to the requirements, for example, on chemical and thermal stability or the optical properties, different glasses or glass ceramics are selected for this purpose.

For example, covering means made of glass or glass ceramic are encountered as viewing window in doors of ovens, refrigerators and microwave devices, as front glass for operating elements of cooking appliances and coffee machines, as cooktop, as worktop for a piece of kitchen or laboratory furniture, for example cabinets and tables, both in the private and professional sphere.

Such covering means generally have a coating over at least part of the surface in order to prevent viewing through the covering means, for example of mechanical or electronic components installed behind it. At the same time, however, they are intended to transmit light which is emitted by such components, for example LEDs or displays, with minimum hindrance. More particularly, the colour locus of the transmitted light is to be altered to a minimum degree.

DE 10 2016 103 524 A1 discloses a glass or glass ceramic article having an opaque coating with a light transmittance of not more than 5%. In order to transmit light from lighting elements disposed behind the coating to a sufficient degree, this coating has a pattern of openings through which the light can pass unhindered. Although the colour neutrality of such a solution is excellent since the colour locus of the light passing through the openings is not altered, this solution has other disadvantages. The openings have to be chosen very precisely in order that, in the switched-off state of the lighting means, the opacity that the covering means is supposed to provide is still assured. However, such precise openings are producible subsequently only with great complexity by means of a laser method. Furthermore, the sizes and distances between such openings are in the same order of magnitude as the pixels of display elements, which, in the case of use of display elements under such a coating with corresponding openings, leads to a loss of image quality owing to the Moiré effect that occurs or owing to additional pixelation of the display presented by the arrangement of the openings.

US 2007108184 A1 discloses a transparent uncoloured glass ceramic plate that can be used as a cooktop and has, on its underside, a metallic coating of sputtered titanium. This layer has an inhomogeneous transmission profile, and so spectral transmittance is greater for red light than for blue or green light. The glass ceramic plate thus coated is thus not colour-neutral to transmitted light. Furthermore, it has a metallic look and, owing to the conductivity of sputtered titanium, is incompatible with capacitative touch sensors mounted under the coating.

EP 3208545 A1 discloses a covering means for a cooking appliance, comprising a glass or glass ceramic substrate and a coating, in which the ratio of greatest to smallest spectral light transmittance in the visible spectral region has a value of not more than 4.0. By virtue of the materials used, the covering means has a grey, blue or red hue and an electrical resistance of at least 3 k$\Omega$/□.

SUMMARY

It is an object of the invention to provide a cover panel for fitout articles or articles of equipment for kitchens or laboratories which overcomes or at least improves the disadvantages that exist in the prior art.

Such a cover panel for a fitout article or article of equipment for a kitchen or laboratory comprises a glass or glass ceramic substrate and a coating on one side of the glass or glass ceramic substrate, wherein the glass or glass ceramic substrate and the coating together have a light transmittance of 1% to 70%, i.e. of at least 1% and at most 70%. The coating has a colour locus in the CIELAB colour space having the coordinates $L^*$ of 20 to 65, $a^*$ of −6 to 6 and $b^*$ of −6 to 6. This colour locus is measured in reflectance with D65 standard illuminant light against a black background through the glass or glass ceramic substrate. In addition, the cover panel is characterized in that the colour locus of the D65 standard illuminant light, after passing through the glass or glass ceramic substrate and the coating, is within a white region W1 determined in the chromaticity diagram CIExyY-2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

In the context of the present invention, a fitout article or article of equipment for a kitchen or laboratory is generally understood to mean a piece of kitchen or laboratory furniture or a preferably electrically operated kitchen or laboratory appliance, irrespective of its specific design. Kitchen or laboratory furniture is especially understood to mean cupboards and tables that have a worktop on their top face. Kitchen appliances such as cooking appliances, refrigerators, microwave appliances, grills, baking ovens, steam cookers, toasters or extractor hoods may be designed either for the private or the professional sector. The article may likewise be a separately arranged control panel, by means of which a user can operate one or more appliances actuatable therewith. Appliances of the invention may, for example, be integrable into kitchen or laboratory furniture or be freestanding. The laboratory appliances also include ovens, climate chambers, refrigerators or hotplates.

In principle, the invention is not restricted to a particular type of glass or glass ceramic, provided that the abovementioned demands on the optical properties are met. For any form of fitout articles and articles of equipment for kitchens and laboratories, however, thermal cycling stability is a particularly important parameter. Especially for parts of appliances where high temperatures arise in the use thereof, such as cooktops, hotplates, ovens, baking ovens with pyrolysis function, microwaves or grills, particularly high demands are applicable. But it is also advantageous for virtually all other areas of a kitchen or laboratory when the materials used are thermally stable since there is always the risk that they will come into contact with hot or very cold articles or liquids. In the event of such contact, there is a very rapid change in the temperature in a locally limited region, which leads to stresses in the material which can lead rapidly to destruction particularly in the case of materials that are prone to brittle fracture, such as glass and glass ceramic.

The most effective way of achieving very good thermal stability is in that the glass or glass ceramic substrate has a linear coefficient of thermal expansion CTE, to ISO 7991, of not more than $\pm 2.5 \times 10^{-6}$/K, preferably not more than $\pm 1.5 \times 10^{-6}$/K, in the temperature range between 20° C. and 300° C., preferably between 20° C. and 700° C. A CTE of at most $\pm 2.5 \times 10^{-6}$/K is understood here to mean a CTE of at least $-2.5 \times 10^{-6}$/K and at most $+2.5 \times 10^{-6}$/K. Especially in the case of glass ceramics, the CTE within this temperature range may also assume negative values. In the case of such a low coefficient of thermal expansion, even large temperature gradients do not lead to the building of stresses in the substrate. This value is achieved, for example, by quartz glass or by lithium aluminium silicate glass ceramics (LAS glass ceramics), for example of the CERAN® brand from SCHOTT AG.

The higher the magnitude of the CTE of the glass or glass ceramic and the greater the temperature gradients that possibly occur in use, the higher the risk of stress-induced fractures. This can be counteracted in that the glass or glass ceramic is thermally or chemically tempered. Such tempering gives rise to a compressive stress at the surface of the glass that counteracts the thermal stress.

Particular preference is given here to thermal tempering for economic reasons. However, for technical reasons, it can be conducted only in the case of glasses having a thickness of at least 2 mm and a CTE over and above $3.5 \times 10^{-6}$/K. In addition, for the thermal tempering, the glass transition temperature $T_g$ of the glasses, measured to ISO 7884-8 or DIN 52324, must not exceed a value of about 650° C., particularly in the case of glasses having a CTE between 3.5 and $6 \times 10^{-6}$/K, in order that tempering with conventional tempering ovens can achieve sufficiently high tempering values of more than about 10 MPa.

Glasses having a CTE between 20 and 300° C. of more than $6 \times 10^{-6}$/K are generally, i.e. even in tempered form, not preferred for use in kitchens and laboratories. The glass or glass ceramic substrate thus preferably has, for the article of the invention, a CTE between 20 and 300° C. of not more than $6 \times 10^{-6}$/K. Glasses having higher CTE, for example soda-lime glass having a CTE of about $9 \times 10^{-6}$/K, can generally be efficiently thermally tempered. Nevertheless, the tempering values achievable are insufficient to be able to compensate for the stresses that arise as a result of the great thermal expansion under high thermal stress. Both for thermally and chemically tempered glass substrates, it should be noted that the tempering is degraded by stress at high temperatures over prolonged periods. The lower the $T_g$ of the glass, the quicker this degradation proceeds. Therefore, tempered glasses for use in kitchens and laboratories preferably have a $T_g$ of at least 500° C., more preferably at least 550° C. Thus, particular preference is given to using glass ceramics having a CTE between 20 and 300° C. of less than $1.5 \times 10^{-6}$/K or glasses having a CTE between 20 and 300° C. of 3.5 to $6 \times 10^{-6}$/K and a $T_g$ of 500 to 650° C., especially of 550 to 650° C.

A factor of similarly great importance to thermal stability is the chemical stability of the glass or glass ceramic substrate to acids and alkalis. In laboratories, this is generally advantageous owing to the handling of chemicals; in kitchens, in particular, resistance to cleaning products and food constituents is important. Especially glasses having high proportions of more than 10% by weight based on oxide of alkali metals or alkaline earth metals, for example soda-lime glass, are therefore not preferred for use in kitchens and laboratories.

The glass or glass ceramic substrate may additionally also be coloured, provided that the covering means fulfills at least the demands with regard to light transmittance, colour locus in reflectance and colour effect in transmission.

A coloured material, no matter what kind, is understood to mean any material which, owing to its composition, absorbs transmitted light such that it has a light transmittance of at most 80%. Coloured materials thus contain colouring or absorbing constituents in their composition. These may, for example, be dyes, pigments or other colouring chemical compounds. By contrast, materials are not considered to be coloured when they have an intrinsic light transmittance of more than 80%, but have a colouring, for example coloured, coating on their surface.

Light transmittance is determined in the wavelength range of 380 nm to 780 nm using D65 standard illuminant light to DIN EN 410.

The coating of the cover panel of the invention serves to adjust the light transmittance and the colour locus of the cover panel in reflectance, and affects the colour effect for transmitted light.

The glass or glass ceramic substrate and the coating together have a light transmittance of 1% to 70%. Light transmittance is thus at least 1% and at most 70%. Light transmittance is preferably chosen appropriately for the lighting elements being used. For example, for display elements, preference is given to a light transmittance in the range of at least 5% and at most 70%. Preferably, the cover panel for the use of display elements has a light transmittance of at least 9%, more preferably at least 15%, even more preferably at least 20%, and of at most 55%, more preferably at most 45% and even more preferably at most 40%. The light transmittance may thus lie, for example, within one of the following ranges: 5-70%, 5-55%, 5-45%, 5-40%, 9-70%, 9-55%, 9-45%, 9-40%, 15-70%, 15-55%, 15-45%, 15-40%, 20-70%, 20-55%, 20-45% or 20-40%.

According to the brightness of the environment, the luminance of a display element in the exterior of the article into which it has been installed should be approximately between 100 and 200 cd/m$^2$, in order to assure good perceptibility. In the case of a light transmittance of the cover panel of 5%, for example, a display element having a luminance of 2000 cd/m$^2$ is necessary in order to produce a luminance of 100 cd/m$^2$ in the exterior. In the case of a light transmittance of 70%, even a display device having a luminance of about 140 cd/m$^2$ is sufficient in order to achieve about 100 cd/m$^2$ in the exterior.

A higher light transmittance of the separating element in the region of the display element has a positive effect on the energy efficiency of the system since a display element can be operated at lower luminance and hence lower energy consumption. Apart from that, display elements with lower maximum luminance are also less expensive to procure.

In the case of use of brighter lighting elements, a lower light transmittance of substrate and coating may also be advantageous. Especially in the case of use of bright LED lighting means or comparably bright lighting means, a transmittance in the range of 1% to 5%, preferably 1% to 3%, especially 1% to 2%, may be advantageous.

The coating has a colour locus in the CIELAB colour space with the coordinates L* of 20 to 65, a* of −6 to 6 and b* of −6 to 6, measured in reflectance with D65 standard illuminant light against a black trap in transmission through the glass or glass ceramic substrate. In a preferred embodiment, the coating has a colour locus with the coordinates 22≤L*≤35, preferably 25≤L*≤30, more preferably 26≤L*≤28, with −4≤a*≤4, preferably −2≤a≤2, and with −4≤b*≤4, preferably −2≤b*≤2. This colour locus is generally perceived by observers as black or at least as dark, which is preferable for fitout articles and articles of equipment for aesthetic reasons.

In another preferred embodiment, the coating has a colour locus with the coordinates 45≤L*≤65, preferably 50≤L*≤60, more preferably 54≤L*≤59, with −4≤a*≤4, preferably −2≤a*≤2, and with −4≤b*≤4, preferably −2≤b*≤2. This colour locus is generally perceived as grey by observers, which is preferred for aesthetic reasons particularly for fitout articles and articles of equipment that include stainless steel elements.

Colour loci having a magnitude of |a*| greater than 6 and/or a magnitude of |b*| greater than 6, irrespective of the corresponding L* value, are clearly perceived as chromatic, which is unwanted for fitout articles and articles of equipment.

Coatings having an L* value of less than 65 and especially of less than 35 additionally have the advantage over coatings having a higher L* value that they reflect less light overall by comparison. As a result, lighting elements mounted beneath or behind the cover panel, such as LEDs or displays, can be better perceived by an observer in the exterior since the contrast, i.e. the ratio between transmitted brightness of the lighting element and reflected brightness of the ambient light, is greater. This is advantageous particularly in typical installation situations of fitout articles and articles of equipment with bright ambient lighting, as is typically the case, for example, in the case of workplace lighting in kitchens and laboratories. In this way, it is also possible to improve user comfort and user safety of such an article. This is advantageous especially in comparison with sputtered metallic layers, for example of titanium or silicon, which typically have an L* value of more than 70.

Alternatively, given the same contrast as in the case of a coating with a brighter colour locus, it is possible to choose a lighting element that emits less light, which contributes to more favourable production costs and improved energy efficiency of the system.

These colour coordinates are measured by placing the cover panel onto a black trap such that the coating is disposed on the black trap side and the substrate on the measuring instrument side. Then the colour locus is measured in reflectance with a commercial colorimeter, for example the Konica Minolta CM-700d spectrophotometer, using D65 standard illuminant, a 10° standard observer. The black trap used may, for example, be the CM-A511 black glass tile from Konica Minolta. In this context, the expression "measurement against a black trap" means that the sample to be measured is disposed between the measuring instrument and a black trap.

In addition, the cover panel of the invention is characterized in that the colour locus of the D65 standard illuminant light, after passing through the glass or glass ceramic substrate and the coating, is within a white region W1 determined in the chromaticity diagram CIExyY-2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

The white region W1 is determined here as a region along the black-body curve in the CIExyY colour space that ranges from colour temperature about 2750 K to about 1 000 000 K and is shifted upward at the upper limit by a value of about y=0.04 relative to the black-body curve and downward at the lower limit by about y=0.07. This results in the following effect: by definition, light from the D65 standard illuminant has a colour temperature of about 6500 K and, when observed directly by a 2° observer, a colour locus of x=0.31 and y=0.33. By the present invention, it is thus possible, on passage of light through the cover panel, to shift the colour locus of the light essentially along the black-body curve, either to higher or to lower colour temperatures, without producing an unwanted tint. White light after passing through is thus still perceived as white light.

The colour locus of light after passing through substrate and coating can be measured by means of a suitable colorimeter, for example the Konica Minolta CS-150 colorimeter.

Display devices such as displays are typically adjusted, for example, such that they emit white light having a colour temperature of 5000 K, 6500 K or 9300 K. The article of the invention thus enables, with commercial displays without any need for further adjustments, production of a colour locus desired for displays of the light emitted by the display in the exterior of the article.

No such shift can be achieved when the coating has cutouts or openings in the region of transmitted light. Therefore, the coating, in a preferred embodiment, has no opening in regions in which light is to pass through the cover panel in the installed state in the fitout article or article of equipment. This is also advantageous since such openings, especially when they have a similar size, number and position to pixels of displays disposed under or behind the cover panel, lead to a reduction in the image quality presentable, since Moiré effects occur and/or the image, symbol or sign shown has a pixelated appearance when viewed through a multitude of openings.

Even irrespective of their size, openings are unwanted in the region of transmitted light since larger openings in the coating than those mentioned above have the effect that components disposed beneath or behind the cover panel become clearly visible to a user in the exterior, which is disadvantageous.

In a preferred embodiment, the separating element is characterized in that the colour locus of the D65 standard illuminant light, after passing through the glass or glass ceramic substrate and the coating, is within a white region W2 determined in the chromaticity diagram CIExyY-2° by the following coordinates:

| White region W2 | |
|---|---|
| x | y |
| 0.25 | 0.27 |
| 0.32 | 0.36 |
| 0.41 | 0.42 |
| 0.42 | 0.36 |
| 0.35 | 0.31 |
| 0.27 | 0.24 |

The white region W2 is determined here as a region along the black-body curve in the CIExyY colour space that ranges from colour temperature about 3500 K to about 20 000 K and is shifted upward at the upper limit by a value of about y=0.025 relative to the black-body curve and downward at the lower limit by about y=0.04. By comparison with W1, this region thus extends along a shorter section of the black-body curve and has a smaller deviation in the x and y coordinates from the black-body curve. White light that passes through such a cover panel is therefore perceived in the exterior of the article of the invention as particularly white and hence achromatic.

In a particularly preferred embodiment, the separating element is characterized in that the colour locus of the D65 standard illuminant light, after passing through the glass or glass ceramic substrate and the coating, is within a white region W3 determined in the chromaticity diagram CIExyY-2° by the following coordinates:

| White region W3 | |
|---|---|
| x | y |
| 0.3 | 0.33 |
| 0.35 | 0.38 |
| 0.41 | 0.42 |
| 0.42 | 0.36 |
| 0.38 | 0.34 |
| 0.33 | 0.3 |

The white region W3 is determined here as a region along the black-body curve in the CIExyY colour space. This range extends from colour temperature about 3500 K to about 6500 K. It corresponds to the white region W2 at the upper limit and the lower limit. Differences arise merely as a result of the rounding of the coordinates to two post-decimal places. By comparison with W2, this range thus extends along a shorter section of the black-body curve. Colour loci in the white region W3 are perceived as being particularly neutral white.

This is surprisingly possible by the present invention even without the use of a black-body compensation filter to compensate for the transmission profile of the coating and of the substrate. In the context of the present invention, a black-body compensation filter is understood to mean an optical filter having a transmission spectrum matched to the transmission spectrum of substrate and coating such that D65 standard illuminant light, after passing through the black-body compensation filter, the substrate and the coating, has a colour locus with coordinates within the white region W1, W2 or if appropriate W3.

According to the invention, such a filter is unnecessary since D65 standard illuminant light, after passing through the separating element, already has a colour locus in this region. Such a filter may optionally nevertheless be disposed between the substrate and a display element, for example when different regions of the separating element for transmitted D65 illuminant light are to produce different colour loci, for example within one of the regions W1, W2 and W3.

Black-body compensation filters may take the form, for example, of printed-on, applied, pressed-on or correspondingly arranged layers, films or sheets. Other colour compensation filters are also conceivable, for example in order to give white light emitted in the interior of the article a coloured appearance to a user in the exterior, for example an appearance with a blue, red, green or any other colour.

In a preferred embodiment, the coated glass or glass ceramic substrates have a transmission at a wavelength of 630 nm of at least 2%, preferably at least 4% and more preferably at least 10%.

In a further preferred embodiment, transmission at a wavelength of 470 nm is at least 1%, preferably at least 2%.

In a preferred embodiment of the invention, a cover panel comprising a coated glass or glass ceramic substrate comprises at least one scattering or diffuser layer disposed beneath or behind the coating of the substrate, preferably with at least one cover layer between substrate coating and scattering or diffuser layer and with at least one cutout in the cover layer and preferably at least one lighting means provided beneath.

Scattering and diffuser layers may optionally also be executed in coloured form. Coloured scattering and diffuser layers may simultaneously function as diffuser and as optical filter.

Such scattering or diffuser layers may have a thickness of 1 to 15 μm, for example. They may contain non-coloured scattering particles, for example of $TiO_2$, $SiO_2$, $Al_2O_3$, $ZrO_2$ or other metal oxides. The average size of such particles may be less than 1 μm. Preferably, the scattering or diffuser layers have high homogeneity of the luminance produced, low granularity and high brightness. This results in a perception of a very homogeneously lit area which is very pleasing to the user.

In a preferred embodiment, the glass or glass ceramic substrate together with the coating has high transmission in the infrared spectral region. This enables the positioning of infrared-detecting sensors in the interior of the article of the invention or the use of radiation heating elements such as infrared sources. According to the sensor or heating element, transmission within a specific spectral region is advantageous here.

The transmission values reported relate to the overall transmission of the sample, measured using an Ulbricht sphere. For this measurement, the sample is positioned between a suitable light source and an Ulbricht sphere at the inlet of the Ulbricht sphere, such that the coating is arranged on the Ulbricht sphere side. At an outlet of the Ulbricht sphere arranged laterally, at an angle of 90° to the beam path, is mounted a suitable sensor for detection of the transmitted light component. This measurement arrangement detects both the directly transmitted component and the scatteringly transmitted component of the light.

For silicon-based infrared sensors, as used, for example, in time-of-flight sensors for contactless input devices for gesture control or approach recognition, such as the VL6180X from ST Microelectronics, the spectral range between 850 and 1000 nm is of particular relevance. In this range, the cover panel preferably has, at at least one wavelength, transmission of at least 3%, preferably at least 10%, more preferably at least 30%, in order to enable the use of such sensors. Particularly for gesture control, high transmissions are advantageous because gestures can then be detected at a greater distance from the outside of the cover panel. Other applications for silicon-based infrared sensors are, for example, receivers for the signals from remote controllers or communication interfaces for optical data transfer.

InGaAs-based infrared detectors are sensitive particularly within the range between 1 and 2 µm. The cover panel is suitable for the use of such detectors when it has, in the region of the cutout, at at least one wavelength, preferably at a wavelength of 1500 nm, transmission of at least 30%, preferably at least 45%, more preferably at least 60%.

The emission maximum of a radiative heating element is found from Wien's displacement law, and for temperatures between 100° C. and 1000° C. is between 7.8 µm and 2.3 µm. For reasons of energy efficiency and in order to prevent excess heating of the cover panel by a radiative heating element, the cover panel, in the range between 3.25 µm and 4.25 µm, at at least one wavelength, has transmission of at least 10%, preferably at least 20%, more preferably at least 30%. In this spectral range, it is also possible to use bolometers or thermal columns disposed in the interior of the article to measure the temperature of a hot object in the exterior, for example a hot cooking or laboratory vessel, when the transmission of the cover panel meets the minimum demands specified.

In a preferred embodiment, the thickness of the glass or glass ceramic substrate is between 2 mm and 12 mm, preferably between 3 and 8 mm, more preferably between 3 and 6 mm. The thickness of the substrate is limited here essentially by the demands on mechanical stability and weight. Glasses thinner than 2 mm cannot be thermally tempered in practice for technical reasons since the cooling rates required for the purpose cannot be achieved at economically justifiable cost. In addition, it has to be noted that the thickness of the substrate can affect its optical properties. In each case, the thickness should be chosen so as to comply with the transmission limits mentioned.

Optionally, the substrate may also have one or more cutouts. Such cutouts may be provided, for example, to accommodate down-draft fume hoods or bushings for pipelines.

Likewise optionally, the substrate may have edge elaboration, for example a facet or a pencil finish.

In addition, the substrate may have specific surface properties on one or both sides. It may have been polished or roughened, for example. In this way, it is possible, for example, to specifically adjust the optical properties, especially the optical scatter of the substrate. It is likewise possible by polishing or roughening to improve the bonding of the coating on the surface of the substrate. Alternatively or additionally, the substrate may also have coatings for adjustment of the surface properties. Such coatings include, for example, anti-reflection coatings, anti-glare coatings, and hydrophobic or hydrophilic coatings.

In a further preferred embodiment, the coating has a sheet resistance of at least 1 kΩ/□, preferably at least 0.5 MΩ/□, more preferably at least 2 MΩ/□, at a test voltage of 1000 V, measured by four-point measurement. Such a high sheet resistance makes it possible for capacitive touch sensors in particular to be disposed beneath or behind the cover panel; the use thereof in the case of higher conductivity of the coating, owing to parasitic capacitances, would be possible only with considerably reduced sensitivity, if at all. The use of induction loops beneath or behind the cover plane is also enabled in this way, since the alternating magnetic field generated by such loops, given an appropriately high electrical resistance of the coating, is not attenuated or scattered by the coating. Scatter of magnetic alternating fields takes place, for example, in the case of layers having a resistance of less than 1 kΩ/□ and a layer thickness lower than the penetration depth of the magnetic field, and leads to poor electromagnetic compatibility of the overall system. Induction loops may be provided, for example, as heating elements or for wireless energy transfer.

In a further preferred embodiment, the coating has a layer thickness of at least 50 nm, preferably at least 100 nm, more preferably at least 200 nm, and at most 2 µm, preferably at most 1 µm and more preferably at most 500 nm. It has been found that layer thicknesses of less than 50 nm on substrates can be produced in sizes as required for cover panels for fitout articles or articles of equipment only with a very high degree of complexity over the entire area with adequate homogeneity of thickness. Layer thicknesses of less than 50 nm therefore lead, under production conditions, to uneconomically high production waste. Layer thicknesses of more than 2 µm are also economically disadvantageous since, by comparison with thinner layers, they are associated with elevated material expenditure and, according to the method, also with a longer production time. In the case of a fixed material system, the layer thickness can be adapted correspondingly for adjustment of the optical properties of the coating.

In a further preferred embodiment, the coating has a maximum spectral reflectance $R(\lambda)$ in the wavelength range of 380 to 780 nm of at most 10%, preferably at most 8%. More preferably, the coating has a maximum spectral reflectance in the wavelength range of 380 to 780 nm of at most 10%, preferably at most 8%. It has been found that cover panels having a coating having a spectral reflectance averaged over the visible light of more than 10%, in the installed state, reflect ambient light so significantly that, even in the case of low brightness of the ambient light, the black impression of the coating is destroyed.

Furthermore, a low reflectance has also been found to be advantageous when a lighting element, especially a display element such as a display, is disposed beneath or behind the cover panel. In the case of an average reflectance of more than 10%, depending on the ambient light, the visibility of such displays in the switched-on state can be greatly reduced. This is the case especially when lighting elements with low brightness and/or layers with low light transmittance are used.

In a further preferred embodiment, the ratio of highest spectral reflectance to lowest spectral reflectance of the coating in the wavelength range of 380 to 780 nm has a value of at most 5, preferably at most 3 and more preferably at most 2. In the ideal case, the ratio is 1 or at least a value between 1 and 1.5 or even between 1 and 1.2. It has been found that such a flat profile of a coating achieves another improvement in the black effect. Especially in the case of a relatively high average reflectance close to 10%, a ratio of more than 5 has the effect that mirror reflections of ambient light in the installed state may be perceived as disruptive in terms of colour even when the measured colour locus of the coating is within the abovementioned limits.

The spectral reflectance $R(\lambda)$ can be measured, for example, by means of a PerkinElmer Lambda 850 UV/VIS spectrophotometer by placing the sample in the instrument such that the measurement is not effected through the substrate. For the measurement, the coating is thus disposed on the side of the substrate facing the measurement sensor.

In a further preferred embodiment, the glass or glass ceramic substrate and the coating together have a haze of less than 5%, preferably less than 2%, more preferably less than 1%. According to standard ASTM D1003, haze is understood to mean the proportion of light transmitted through a sample which is deflected by scatter by an angle of more than 2.5° relative to the optical axis of the light of the CIE-C illuminant incident on the sample. Haze can be measured, for example, with the BYK hazegard instrument according to standard ASTM D1003. At a haze of at most 5%, there is thus only slight wide-angle scatter of transmitted light. This is advantageous particularly when a display device such as a display or projector is disposed beneath or behind the cover panel since a haze of more than 5% has an adverse effect on image quality, especially image sharpness.

A means of reducing the overall transmission may additionally be disposed on the side of the cover panel facing the inside of the article. Such a means is disposed on the side facing the inside, in order that it is protected from outside influences, especially damage by mechanical stresses. Such a means may be a coating on the glass or glass ceramic substrate, a film, a self-supporting carrier material, for example a sheet or film of glass, plastic or insulation materials, which contain sheet silicates such as mica or fibrous materials.

Such a means of reducing the overall transmission is preferably used in particular when the light transmittance of substrate and coating together exceeds 2%. In this way, it is possible to assure sufficient opacity of the cover panel. It is advantageous here to match the light transmittance of such a means to that of the cover panel. Advantageously, the higher the light transmittance of the cover panel, the lower the light transmittance of the means of reducing the overall transmission will be. It is advantageous when the overall transmittance of substrate, coating and means of reducing the overall transmission does not exceed 6%, especially 4% and very particularly 2%.

If a lighting element is disposed beneath or behind the cover panel, the means of reducing the overall transmission preferably has at least one cutout in the region in which the emitted light is to pass through the cover panel.

Coatings that fulfill the aforementioned demands preferably contain spinels or cermets. In addition, they may contain carbides or carbonitrides. They preferably consist of one of these materials. These coatings may be produced by means of sputtering.

Spinels are known from mineralogy and from ceramic solids. The inventors have found that oxidic spinels, surprisingly, as an alloy in reactively sputtered form from a metallic target with substoichiometric addition of oxygen, depending on the amount of oxygen added, have a very low L* value of less than 35 or else a high L* value of 50-65. In this way, it is possible in principle to produce dark hues or else grey, brightly reflective hues with simultaneously low electrical conductivity. The grey hues here may have colour coordinates in the range of $50<L^*<65$, $-5<a^*<5$ and $-5<b^*<5$. In addition, they may have a flat profile of the spectral reflectance. The ratio of greatest to smallest reflectance in the visible spectral region may be less than 1.5. The average reflection here may be about 33%. The transmission profile of such layers may also be flat, and so D65 standard illuminant light, after passing through such a coating, is within the white region W1.

In the wavelength range of 780 to about 4500 nm, coatings of spinels can have high spectral transmittances of more than 30% or even more than 50%, up to more than 80%. Essentially, spectral transmittance in the infrared spectral region in the case of cover panels with spinel coatings is limited not by the coating but by the substrate used. Uncoloured transparent LAS glass ceramics, for example of the CERAN CLEARTRANS® brand from SCHOTT AG, with a spinel coating at a wavelength of about 3750 nm can have a spectral transmittance of more than 40%. Such coatings are thus especially suitable for the use of radiation heating elements or infrared sensors behind or under the cover panel. Sheet resistances are 1.8 or 3160 MΩ/□ at a test voltage of 1000 V.

Suitable spinels have a composition of the formula $A_xC_uB_yD_vE_zF_w$ where A and C are selected from the group consisting of Cr2+; Mn2+, Fe2+, Co2+, Ni2+, Cu2+, Zn2+; Al3+, Sn2+/4+, Ti4+, Zr4+, or the lanthanides and mixtures thereof. B and D are selected from the group consisting of Mn3+, Fe3+, Co3+, Ni3+, Cu3+, Al3+, Ga3+, Sn4+, Sc3+, Ti4+, Zn2+, or the lanthanides and mixtures thereof. E and F are preferably selected from the group consisting of the divalent anions of S, Se and O and mixtures thereof. The values of x, u, y, v, z and w satisfy the following formulae:

$$0.125 < (x+u)/(y+v) \leq 0.55 \text{ and}$$

$$z+w=4.$$

Preferably, the coating includes crystallites, where at least 95% by weight of the crystallites show symmetric cubic crystal structures of the spinel type.

In order to improve colour neutrality, it is possible to modify the layer system by means of a compensation layer disposed between the substrate and the spinel coating. The L* value is virtually unaffected thereby. Compensation layers may be materials that have their refractive indices between substrate and spinel coating in the visible spectrum, e.g. CeO2, HfO2, Y2O3, Si3N4, AlN, SiO2, Al2O3, AlTiOx, TiSiOx, SiOxNy, AlSiOxNy. It is also possible to use substoichiometric variants as compensation layer. The layer thickness of such compensation layers is preferably in the range of 25 to 500 nm, more preferably 35 to 250 nm. Surprisingly, such a compensation layer changes only the colour locus of the coating in reflectance, and not the transmission characteristics. Thus, such a compensation layer does not act as a black-body compensation filter.

In a preferred embodiment, the coating consists of a spinel composed of one of the following material systems: aluminium spinels, chromium spinels, iron spinels, titanium spinels, cobalt spinels. More preferably, the coating consists of CoFeMnCr spinel and optionally has a compensation layer of SiOxNy.

In a further preferred embodiment, the coating consists of a cermet with an oxidic matrix composed of $SiO_2$, $Al_2O_3$, $ZrO_2$, $TiO_2$ or mixed oxides thereof and a metallic component composed of Ti, Si, Al, Mo, Zr, Cu, Nb, Co, Cr, W, Ta, Ni, B or an alloy of at least two of these metals. In the context of the present invention, the term "cermets" is understood to mean composite materials composed of an oxidic matrix with a metallic component dispersed therein. Embodiments containing such composite materials are particularly preferred here since they combine the optical properties of the metallic component with the low electrical conductivity of the matrix material and hence are of particularly good suitability for the coating of a cover panel of the invention.

It may be a feature of these cermet layer systems that they have very high sheet resistance, >20 MΩ/□, with adjustable light transmittance of 1-70%. In these transmission regions, it was possible to produce very colour-neutral layers with low L* value. Typical values for this were, for example, L=27 at 35% light transmittance. Cermet layer systems, especially at high transmittances of >20%, showed colour loci with a* and b* values within a region of +/−2, in specific cases even well below that. The average spectral reflectance of cermet coatings with a light transmittance of 35% was 5% with a ratio of greatest to smallest value in the visible spectral region of about 1.5. The transmission profile of such layers has been found to be very flat, such that D65 standard illuminant light, after passing through the coating, was in the white region W1 or even in the white region W2. In the infrared spectral range between 780 and 4250 nm, these cermet layer systems have only weak absorption, and so spectral transmittance here too is limited by the substrate and not by the coating. The cermet layers examined, at a wavelength of about 3750 nm, had a transmittance of more than 40%.

In a preferred embodiment, oxidic matrix and metallic component are matched to one another such that they have elevated thermal stability. Thermal stability can be determined, for example, by measuring the CIELAB colour locus after the sample has been stressed at 380° C. for 80 hours and comparing the measurements with the unstressed sample. A particularly advantageous option here is a material pair of metal having high oxygen affinity for formation of the metal oxide matrix and a metal having lower oxygen affinity for the formation of the metallic component in the cermet. Particular preference is given to $SiO_2$ or $Al_2O_3$ as the metal oxide matrix in combination with Mo as the metallic component. Si and Al have a higher oxygen affinity than Mo, which means that the formation of $SiO_2$ or $Al_2O_3$ is preferred over Mo oxide. At the same time, in the case of very dense layers, the oxidic matrix acts as oxidation barrier and protects the Mo from oxidation. Mixed oxides, especially composed of $SiO_2$ and $Al_2O_3$, are also suitable for use as metal oxide matrix.

In a preferred embodiment, $SiO_2$ is used for the oxidic matrix. In that case, the ratio of Mo to Si in the coating may be at least 5:95, preferably at least 10:90, more preferably 15:85 and especially 20:80, in % by weight. At the same time, it may preferably be at most 50:50, more preferably at most 45:55, especially preferably at most 40:60 and in particular at most 35:65, in % by weight. The ratio of Mo to Si in the coating may thus, for example, be within a range of 5:95 to 50:50% by weight, 10:90 to 45:55% by weight, 15:85 to 40:60% by weight or even 20:80 to 35:65% by weight. These ratios are determined using the proportions by weight of Mo and Si in the coating. This does not take account of the proportion by weight of oxygen or other constituents of the coating. The person skilled in the art will adjust the proportion of oxygen such that the coating meets the respective demands.

In a particularly preferred embodiment, the coating, apart from Mo, Si, oxygen and unavoidable impurities, does not contain any further constituents.

The use of such $MoSiO_x$ cermets has been found to be particularly advantageous since these have a particularly flat transmission profile and a particularly flat profile of spectral reflectance, and at the same time high electrical resistance and high thermal stability.

For thermal stabilization, cermets, and also spinels, may additionally be provided with an oxidation barrier. These may be, for example: oxides or nitrides or oxynitrides of at least one of the following materials: Si, Al, Ti, Zr, Sn, Cr, Zn, Nb, Y, Ta, Mo, B. Silicon nitride in particular has been found to be a preferred oxidation barrier for cermets, and silicon oxide in particular for spinels. Oxidation barrier layers can also have a positive effect on transmission in the infrared.

The inventors have found that it is surprisingly possible, with coatings composed of carbides and carbonitrides on glass or glass ceramic, to establish low L* values in the region of 30 at a colour locus of −3<a*<3, −3<b*<3 in reflectance. Furthermore, the layers have an average reflectance of about 4% to 8% and a ratio of maximum to minimum reflectance in the visible spectral region of about 1.5. In the infrared spectral region, these layers even at 950 nm transmit more than 50% and do not have any significant absorption in the range of about 1250 to at least 4000 nm, and so the spectral transmission of a cover panel in this range is limited by the substrate.

These layer systems may be produced as individual layers or as a layer system with the compensation layers already described for spinels between substrate and coating and/or with additional oxidation barriers. The person skilled in the art will select here, from the materials described above, a combination with appropriate refractive index between that of the substrate and that of the coating, and an appropriate layer thickness. In the case of use of layers based on carbides or carbonitrides, preferably at least one of the following materials is present in the coating: Si, Zr, W, Ti, Mo, Cr, B, DLC.

All the layer systems mentioned are preferably produced by means of magnetron sputtering, especially by means of reactive moderate-frequency sputtering or high-frequency sputtering. In reactive moderate-frequency sputtering, it is possible to use metallic targets, for example composed of pure metals or composed of alloys, and to supply oxygen or nitrogen, for example, as reactive process gases. Argon is used as non-reactive process gas.

Spinel coatings can be produced, for example, by means of reactive moderate-frequency sputtering by using a target composed of an alloy of the metal cations, especially a target composed of a CoFeMnCr alloy, and using oxygen as reactive gas. The amount of oxygen added can be used here to vary the stoichiometry of the coating, and especially also set it to a substoichiometric value, i.e. with oxygen deficiency. Particular preference is given to using, for the target alloy, a composition range in % by weight of

| | |
|---|---|
| Co | 15-25, especially 19-21, |
| Fe | 30-40, especially 34-36, |
| Mn | 14-24, especially 18-20, and |
| Cr | 21-31, especially 25-27. |

The molar ratio of the composition of the target also corresponds to the molar proportions of Co, Fe, Mn and Cr in the coating.

Cermets can likewise be produced, for example, by means of reactive moderate-frequency sputtering. When the metal that forms the oxide matrix has sufficiently higher oxygen affinity compared to the metal that forms the metallic component, it is possible to use an alloy target in the sputtering operation. Such an alloy target preferably consists of these metals apart from unavoidable impurities. Unavoidable impurities are understood to mean those impurities that cannot be avoided either for technical or economic reasons.

More particularly, an alloy target composed of Mo and Si may be used. Such an alloy target contains preferably at least 5%, more preferably at least 10%, especially preferably at least 15%, in particular at least 20% or even at least 25%, by weight of Mo. Such an alloy target contains preferably at most 50%, more preferably at most 45%, especially preferably at most 40%, in particular at most 35%, by weight of Mo. The composition is thus, for example, within one of the ranges of 5% to 50% by weight of Mo and 95% to 50% by weight of Si, 10% to 50% by weight of Mo and 50% to 90% by weight of Si, 20% to 40% by weight of Mo and 60% to 80% by weight of Si, or 25% to 35% by weight of Mo and 65% to 75% by weight of Si. The molar ratio of the composition of the target also corresponds to the molar proportions of Mo and Si in the coating. Preferably, the target does not contain any further constituents apart from Mo, Si and unavoidable impurities.

The oxygen is added as reactive gas in the sputtering operation. Since the oxygen reacts preferentially with the Si owing to the different affinities, the cermet structure composed of $SiO_2$ matrix is formed with Mo as metallic component.

Alternatively, it is possible to use two separate metallic targets, for example one composed of aluminium and one composed of Cu or one composed of Si and one composed of Mo, and to dispose these such that co-sputtering is possible, i.e. simultaneous deposition of the two materials on one substrate. The reactive gas is then preferably supplied only in the region of the target for formation of the metal oxide matrix, i.e., for example, to the aluminium target. This has the advantage over the use of an alloy target that the composition of the coating can be more easily varied.

Carbides and carbonitrides can be produced, for example, by means of high-frequency sputtering using ceramic targets. In this case, the targets may already have the desired composition of the layer, i.e., for example, SiC or TiCN.

A ceramic target preferably consists of 5% to 60% by weight of C and 40% to 95% by weight of Si, preferably of 20% to 55% by weight of C and 45% to 80% by weight of Si, especially of 40% to 50% by weight of C and 50% to 60% by weight of Si. The molar ratio of the composition of the target also corresponds to the molar proportions of C and Si in the coating.

Alternatively, it is possible to use a metallic target, for example Si or Ti, in combination with a carbon target, for example a graphite target, by means of co-sputtering. In this way, it is possible to vary the stoichiometry of the coating by choosing the sputtering rates of the respective targets correspondingly via the sputtering output. In addition, in such a sputtering process, it is possible to supply nitrogen as reactive gas for the production of carbonitrides.

Table 1 shows, by way of example, inventive coatings of the spinel and cermet material types, and comparative examples of a spinel. All layers were produced by means of reactive moderate-frequency sputtering. For the spinel and cermet layers, metallic alloy targets were used, and oxygen or nitrogen was supplied as reactive gas.

Materials used here were CoFeMnCr for the spinel layers and MoSiOx for the cermet layers. For Examples 3 to 10 in Table 1, the relative ratio of the proportion of molybdenum (Mo) and silicon (Si) in the coatings is reported in % by weight. The oxygen content of the coatings is not taken into account in this value.

The substrate used for all layers was a 4 mm-thick uncoloured transparent LAS glass ceramic of the CERAN CLEARTRANS® type from SCHOTT AG.

For all examples, the CIELAB colour locus in reflectance, the light transmittance LT, the haze and the sheet resistance are reported. All measurements were conducted as described above. For all examples, in addition, the colour coordinates x and y in the CIExyY colour system were determined for transmitted D65 standard illuminant light as described above. In addition, for these samples, the spectral light transmittances at 470 nm, 630 nm, 950 nm, 1600 nm and 3750 nm are reported.

Comparative example V1 is a dark spinel coating without a compensation layer that does not meet the demands with regard to colour locus in reflectance. The high negative b* value means that this coating looks blue.

All examples except for Example 3 are colour-neutral black coatings with a colour locus in the region of $26<L^*<37$, $-3<a^*<3$, $-3<b^*<3$.

Sample 3 is a colour-neutral grey coating with a colour locus in the region of $55<L^*<58$, $-2<a^*<2$ and $-5<b^*<5$.

TABLE 1

EXAMPLES OF INVENTIVE COATINGS AND COMPARATIVE EXAMPLE.

| No. | V1 | 1 | 2 |
|---|---|---|---|
| Type | Spinel | Spinel + compensation layer | Spinel |
| Material | CoFeMnCr | CoFeMnCr + SiOxNy | CoFeMnCr |
| Colour | blue | black | grey |
| Colour locus | | | |
| L* | 29.79 | 30.48 | 57.62 |
| a* | 1.86 | −0.75 | −1.9 |
| b* | −17.95 | 0.57 | 4.61 |
| x | 0.39 | 0.387 | 0.34 |
| y | 0.39 | 0.378 | 0.35 |
| Transmission | | | |
| LT [%] | 37.6 | 33.2 | 38.1 |
| 950 nm [%] | 59.4 | 67.1 | 52.8 |
| 1600 nm [%] | 63.3 | 63.2 | 66.1 |
| 3750 nm [%] | 43.6 | 43.5 | 44.4 |
| Haze [%] | 0.11 | 0.28 | 0.35 |
| Other properties | | | |
| R [MΩ/□] | >20 | >20 | 1.87 |
| Thickness [nm] | | 200 + 45 | |

| No. | 3 | 4 | 5 | 6 |
|---|---|---|---|---|
| Type | Cermet | Cermet | Cermet | Cermet |
| Material | MoSiOx | MoSiOx | MoSiOx | MoSiOx |
| Mo | 32 | 43 | 14 | 22 |
| Si | 68 | 57 | 86 | 78 |
| Colour | black | black | black | black |
| Colour locus | | | | |
| L* | 27.1 | 29.0 | 27.4 | 27.2 |
| a* | 0.4 | −0.1 | 0.3 | −0.8 |
| b* | 1.2 | 0.8 | 0.1 | 1.4 |
| x | 0.368 | 0.43 | 0.45 | 0.37 |
| y | 0.374 | 0.40 | 0.41 | 0.37 |
| Transmission | | | | |
| LT [%] | 32.8 | 2.6 | 2.9 | 29.5 |
| 470 nm [%] | | 1.1 | 1.0 | 20.2 |
| 630 nm [%] | | 4.4 | 5.2 | 38.4 |
| 950 nm [%] | 65.3 | 13.8 | 20.1 | 59.8 |
| 1600 nm [%] | 83.4 | 40.5 | 51.4 | 80.2 |
| 3750 nm [%] | 47.3 | 40.2 | 40.9 | 47 |
| Haze [%] | 0.22 | 0.3 | 0.3 | 0.2 |
| Other properties | | | | |
| R [MΩ/□] | >20 | >20 | >20 | >20 |
| Thickness [nm] | | | | |

| No. | 7 | 8 | 9 | 10 |
|---|---|---|---|---|
| Type | Cermet | Cermet | Cermet | Cermet |
| Material | MoSiOx | MoSiOx | MoSiOx | MoSiOx |
| Mo | 32 | 32 | 32 | 32 |
| Si | 68 | 68 | 68 | 68 |
| Colour | black | black | black | black |

TABLE 1-continued

EXAMPLES OF INVENTIVE COATINGS AND COMPARATIVE EXAMPLE.

| Colour locus | | | | |
|---|---|---|---|---|
| L* | 26.9 | 26.4 | 27.1 | 27.8 |
| a* | 0.6 | 2.0 | 1.0 | −2.8 |
| b* | 1 | −1.8 | −2.4 | 1.2 |
| x | 0.37 | 0.38 | 0.37 | 0.37 |
| y | 0.37 | 0.39 | 0.38 | 0.38 |
| Transmission | | | | |
| LT [%] | 32.0 | 35.5 | 36.7 | 34.4 |
| 470 nm [%] | 21.8 | 22.7 | 23.7 | 24.1 |
| 630 nm [%] | 41.3 | 45.8 | 45.8 | 44.2 |
| 950 nm [%] | 65.1 | 54.9 | 65.1 | 66.1 |
| 1600 nm [%] | 82.2 | 79.9 | 81.3 | 80.4 |
| 3750 nm [%] | 46.9 | 47.8 | 47.8 | 47.5 |
| Haze [%] | 0.2 | 0.3 | 0.3 | 0.3 |
| Other properties | | | | |
| R [MΩ/□] | >20 | >20 | >20 | >20 |
| Thickness [nm] | | | | |

For all examples, D65 standard illuminant light after passage through the coating and the substrate has a colour locus in the white region W1. With the exception of Examples 4 and 5, all examples are also within the white regions W2 and W3.

All samples have a haze of at most 1% and are thus suitable for use in combination with display elements such as TFT displays or projectors.

All examples have a sheet resistance of distinctly more than 1 kΩ/□ and are thus suitable both for use with induction loops and with capacitative touch sensors.

BRIEF DESCRIPTION OF THE DRAWINGS

FIG. 1b shows an enlarged detail from FIG. 1a.

DETAILED DESCRIPTION

Figure 1A:
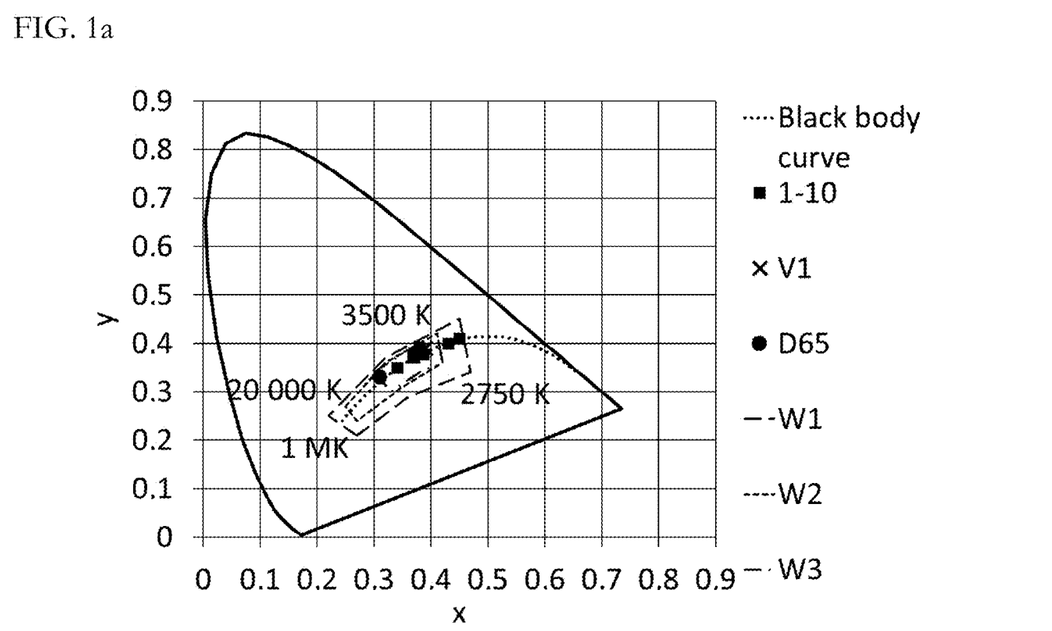
FIG. 1a shows a chromaticity diagram of the CIExyY colour space.

FIG. 1a shows a chromaticity diagram of the CIExyY colour space with 2° standard observer (CIExyY-2°).

FIG. 1a shows the following elements: the black-body curve as a dotted line, the two white regions W1 and W2 as dashed lines, the white region W3 as a dashed line with dots, the colour coordinates of D65 standard illuminant light as a dot, the colour coordinates of D65 standard illuminant light after passing through working examples 1-10 as squares, and the colour coordinates of D65 standard illuminant light after passing through comparative example V1 as x.

Figure 1B:
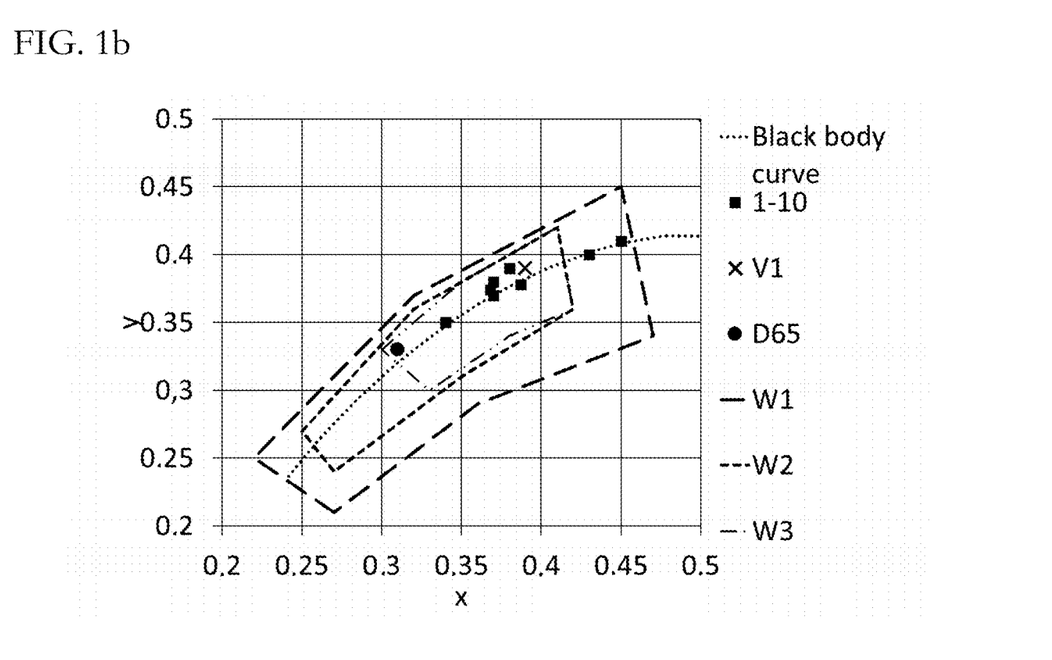

FIG. 1b shows an enlarged detail from FIG. 1a.

Every point on the black-body curve corresponds to the colour locus of the light emitted by a black-body radiator at a defined temperature, called the colour temperature. This curve is of particular relevance to human perception since the sun likewise corresponds to a black-body radiator and hence the colour of sunlight is on the black-body curve. According to the position of the sun, the colour locus moves between cooler and warmer colour loci; a colour temperature of 20 000 K corresponds to a clear sky and a temperature of 3500 K to evening sunlight shortly before the commencement of dusk. Colour loci at or close to the black-body curve are therefore perceived as white and particularly natural.

All examples are within the white region W1, distributed along the black-body curve. Example 5 produces a particularly warm colour temperature at somewhat below 3000 K. This corresponds roughly to an incandescent lamp with a power of 200 W.

Figure 2:
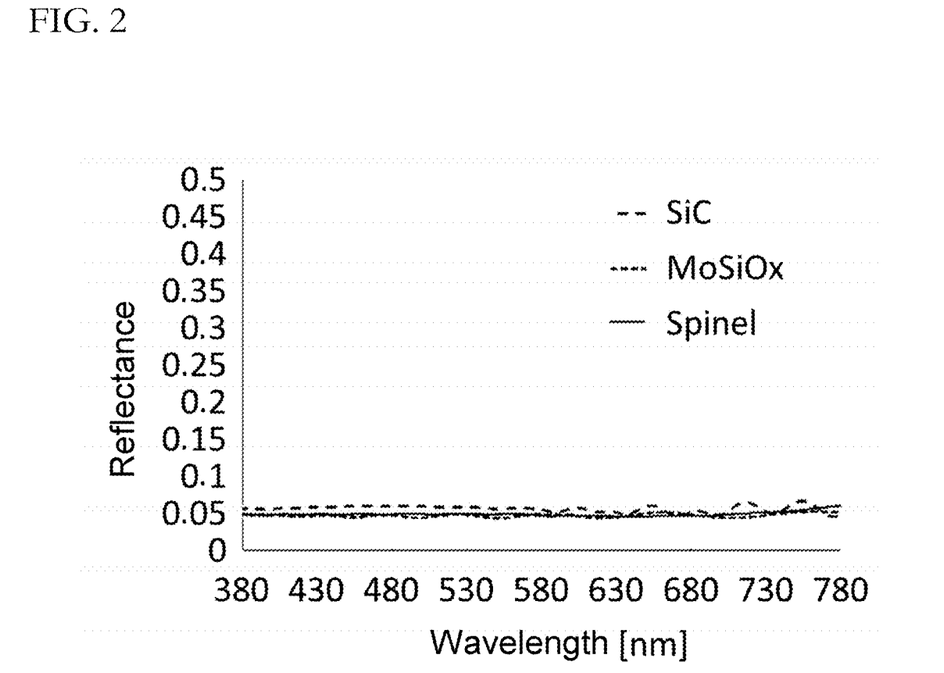
FIG. 2 shows a spectral reflectance of Examples 1 and 5.

FIG. 2 shows the spectral reflectance of Examples 1 ("spinel", solid line) and 5 ("MoSiOx", short-dashed line) and of an SiC coating of the invention ("SiC", long-dashed line) over the entire visible spectral range of 380 to 780 nm.

All three examples shown have very low spectral reflectances over the entire visible spectral region of less than 10%, and an average of about 5%. In addition, the curves have a very flat profile and have only minimal differences between the maximum and minimum reflectances.

Given such low reflectances, light that passes through such a cover panel can be very well perceived on the other side even in the case of very bright ambient light.

Since the curves have a very flat profile, the colour locus of reflected light is not shifted and the cover panel looks particularly colour-neutral.

Figure 3:
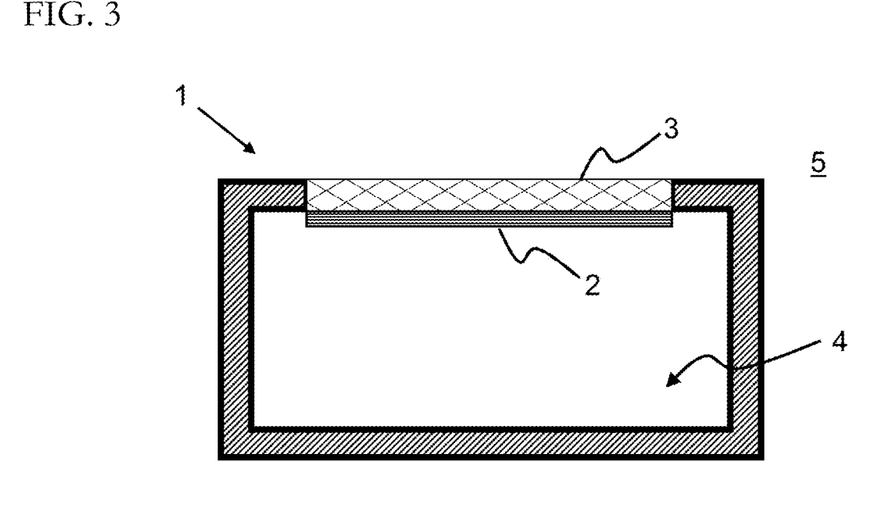
FIG. 3 is a schematic diagram of an embodiment of a fitout article or article of equipment with a cover panel of the invention in cross section.

FIG. 3 contains a schematic diagram of one embodiment of a fitout article or article of equipment (1) with a cover panel (3) of the invention in cross section. The cover panel (3) here separates sections of the interior (4) of the article (1) from the exterior (5). The cover panel consists, in the diagram, of a glass or glass ceramic substrate with the coating (2) atop the substrate. Collectively, the substrate and coating (2) have a light transmittance of 1% to 70%. The colour locus of the coating (2) in the CIELAB colour space is in the region of the coordinates L* of 20 to 65 and a* of −6 to 6 and b* of −6 to 6, measured in reflectance with D65 standard illuminant light against a black trap and in transmission through the glass or glass ceramic substrate. The colour locus of D65 standard illuminant light after passing through the glass or glass ceramic substrate and the coating (2) is within the white region W1.

Fitout articles or articles of equipment for kitchens or laboratories having cover panels of the invention may contain a multitude of components in their interior.

The articles may, for example, have one or more heating elements for heating an article, for example a pan, in the exterior or even in the interior of the article. These may especially be radiative heating elements, induction heating elements or microwave generators.

The articles may have display elements and lighting elements such as point, linear or areal light sources. These include, for example, LEDs, optical fibres and OLEDs. These light sources can emit in a particular colour, especially white, red, green and/or blue, or else variable colours. The usable display elements include, for example, graphic displays or segment displays. The graphic displays include, for example, TFT displays, especially LCDs or OLED displays. The segment displays especially include 7-segment displays. More particularly, it is also possible to provide red-illuminating TFT displays.

Between these lighting elements and the cover panel, it is possible for additional colour filters to be provided, for example in order to be able to utilize a white LED for production of a coloured lighting effect with a defined colour locus and high colour saturation.

Lighting elements may especially also be disposed in the hot region in the vicinity of heating elements. In this case, especially for the production of white lighting effects in the exterior of the article, it is advantageous that no temperature-sensitive black-body compensation filters are required.

The articles may have cooling aggregates, for example Peltier elements, in thermal contact with the cover panel in order to produce a cooling surface, for example for cooling of foods or chemicals, on the exterior-facing side of the cover panel.

The article may have various sensors, for example capacitative touch sensors for control or infrared sensors for gesture control or for measurement of the temperature of hot articles in the exterior, for example hot pans. Such sensors may have been printed, pressed, bonded or adhesive-bonded, or arranged in some other way, on the underside or reverse side of the substrate. This is particularly true of touch sensors.

In addition, the article may have microphones and cameras, for example for voice control or user recognition and authentication. This may be particularly advantageous in laboratories, for example, if the article may be used only by correspondingly trained personnel.

The article may have various interfaces for communication, for example WLAN, Bluetooth or NFC modules or infrared interfaces. By means of such interfaces, the article can be connected, for example, either to the Internet or to other articles in its vicinity, for example pans with a corresponding interface or other electronic devices. More particularly, for control and communication, it can be connected to a mobile electronic device, such as a mobile phone or a tablet.

The article may contain a device for wireless energy transmission from articles in the exterior, especially by means of induction coils and in accordance with the Qi standard.

The cover panel may have coatings on the exterior-facing side, for example anti-scratch layers, anti-reflection layers, anti-glare layers, decorative layers, easily cleanable layers or infrared-reflecting layers, provided that these do not alter the essential optical properties of the cover panel.

The cover panel may have cutouts, for example recesses for sinks or down-draft fume hoods or bushings for pipelines.

All these constituents may be present individually or in combination.

It has been found that, surprisingly, it is possible with a cover panel of the invention to fulfill the multitude of use-specific demands particularly efficiently. The optical properties can be adjusted such that lighting means mounted beneath or behind the cover panel can be seen clearly, brightly and with the desired colour impression. At the same time, however, viewing through the cover panel can be sufficiently prevented. In this way, it is possible to achieve a dead front effect in a particularly efficient manner. This means that electronic components, even in the switched-off state, are not visible through the cover panel. Particularly in the switched-off state, this gives rise to a particularly homogeneous and pleasing look of the covering means. Nevertheless, the covering means are combinable with a multitude of different sensors. These include, for example, capacitative or inductive sensors and infrared sensors at various wavelengths.

What is claimed is:

1. A cover panel for a fitout article or article of equipment for a kitchen or laboratory, comprising:
   a glass or glass ceramic substrate; and
   a coating on one side of the substrate,
   wherein the substrate and the coating together have a light transmittance of 1% to 70%,
   wherein the coating has a colour locus in the CIELAB colour space with the coordinates $L^*$ of 20 to 65 and $a^*$ of −6 to 6 and $b^*$ of −6 to 6, measured in reflectance with D65 standard illuminant light against a black trap in transmission through the substrate, and
   wherein the cover panel has a colour locus of the D65 standard illuminant light, after passing through the substrate and the coating, is within a white region W1 determined in the chromaticity diagram CIExyY-2° by the following coordinates:

| White region W1 | |
|---|---|
| x | Y |
| 0.27 | 0.21 |
| 0.22 | 0.25 |
| 0.32 | 0.37 |
| 0.45 | 0.45 |
| 0.47 | 0.34 |
| 0.36 | 0.29. |

2. The cover panel of claim 1, wherein the cover panel does not include a black-body compensation filter.

3. The cover panel of claim 1, wherein the colour locus in the CIELAB colour space has the coordinates $22 \leq L^* \leq 35$, with $-4 \leq a^* \leq 4$, and with $-4 \leq b^* \leq 4$.

4. The cover panel of claim 1, wherein the colour locus in the CIELAB colour space has the coordinates $45 \leq L^* \leq 65$, with $-4 \leq a^* \leq 4$, and with $-4 \leq b^* \leq 4$.

5. The cover panel of claim 1, wherein the colour locus of the D65 standard illuminant light is within a white region W2 determined in the chromaticity diagram CIExyY-2° by the following coordinates:

| White region W2 | |
|---|---|
| x | Y |
| 0.25 | 0.27 |
| 0.32 | 0.36 |
| 0.41 | 0.42 |
| 0.42 | 0.36 |
| 0.35 | 0.31 |
| 0.27 | 0.24. |

6. The cover panel of claim 1, wherein the substrate together with the coating has a transmission at a wavelength of 1500 nm of at least 30%.

7. The cover panel of claim 1, wherein the substrate together with the coating has a transmission at at least one wavelength in a range between 850 nm and 1000 nm of at least 3%.

8. The cover panel of claim 1, wherein the substrate together with the coating has a transmission at at least one wavelength in a range between 3.25 µm and 4.25 µm of at least 10%.

9. The cover panel of claim 1, wherein the substrate is a glass ceramic substrate having a coefficient of thermal expansion CTE between 20 and 300° C. of less than $\pm 2.5 \times 10^{-6}$/K.

10. The cover panel of claim 1, wherein the substrate is a glass substrate having a coefficient of thermal expansion CTE between 20 and 300° C. of 3.5 to $6 \times 10^{-6}$/K and a glass transition temperature $T_g$ of 500 to 650° C.

11. The cover panel of claim 1, wherein the coating has a sheet resistance of at least 1 kω/☐ at a test voltage of 1000 V.

12. The cover panel of claim 1, where the coating has an average spectral reflectance in a wavelength range of 380 to 780 nm of at most 10% measured in transmission through the substrate.

13. The cover panel of claim 12, wherein the coating has a ratio of highest spectral reflectance to lowest spectral reflectance in the wavelength range of 380 to 780 nm that equals 1 to 5.

14. The cover panel of claim 1, wherein the substrate and the coating together have a haze of less than 5% measured to ASTM-D1003.

15. The cover panel of claim 1, wherein the coating comprises a material system selected from a group consisting of: a spinel, a cermet, a carbide, and a carbonitride.

16. The cover panel of claim 1, the coating comprises a material system selected from a group consisting of: aluminium spinels, chromium spinels, iron spinels, titanium spinels, cobalt spinels, and CoFeMnCr spinels.

17. The cover panel of claim 1, wherein the coating comprises a cermet with an oxidic matrix composed of $SiO_2$, $Al_2O_3$, $ZrO_2$, $TiO_2$, or mixed oxides thereof and a metallic component composed of Ti, Si, Al, Mo, Zr, Cu, Nb, Co, Cr, W, Ta, Ni, B or an alloy of at least two of these metals.

18. The cover panel claim 1, wherein the coating consists of an $MoSiO_x$ cermet.

19. The cover panel claim 1, wherein the coating comprises a cermet with an oxidic matrix composed of $SiO_2$, $Al_2O_3$, $ZrO_2$, $TiO_2$, or mixed oxides thereof and a metallic component composed of Ti, Si, Al, Mo, Zr, Cu, Nb, Co, Cr, W, Ta, Ni, B or an alloy of at least two of these metals and does not contain any further constituents other than unavoidable impurities.

20. The cover panel claim 1, wherein the D65 standard illuminant light, after passing through the substrate and the coating, is homogenous.

21. A cover panel for a fitout article or article of equipment for a kitchen or laboratory, comprising:
a glass or glass ceramic substrate; and
a coating on one side of the substrate,
wherein the substrate and the coating together have a light transmittance of 1% to 70%,
wherein the coating has a colour locus in the CIELAB colour space with the coordinates L* of 22 to 35 and a* of −4 to 4 and b* of −6 to 6, measured in reflectance with D65 standard illuminant light against a black trap in transmission through the substrate, and
wherein the cover panel has a colour locus of the D65 standard illuminant light, after passing through the substrate and the coating, is within a white region W1 determined in the chromaticity diagram CIExyY-2° by the following coordinates:

| White region W1 | |
|---|---|
| x | Y |
| 0.27 | 0.21 |
| 0.22 | 0.25 |
| 0.32 | 0.37 |
| 0.45 | 0.45 |
| 0.47 | 0.34 |
| 0.36 | 0.29. |

22. A cover panel for a fitout article or article of equipment for a kitchen or laboratory, comprising:
a glass or glass ceramic substrate; and
a coating on one side of the substrate,
wherein the substrate and the coating together have a light transmittance of 1% to 70%,
wherein the coating has a colour locus in the CIELAB colour space with the coordinates L* of 45 to 65 and a* of −4 to 4 and b* of −6 to 6, measured in reflectance with D65 standard illuminant light against a black trap in transmission through the substrate, and
wherein the cover panel has a colour locus of the D65 standard illuminant light, after passing through the substrate and the coating, is within a white region W1 determined in the chromaticity diagram CIExyY-2° by the following coordinates:

| White region W1 | |
|---|---|
| x | Y |
| 0.27 | 0.21 |
| 0.22 | 0.25 |
| 0.32 | 0.37 |
| 0.45 | 0.45 |
| 0.47 | 0.34 |
| 0.36 | 0.29. |

* * * * *